United States Patent
Saitoh

(10) Patent No.: US 6,665,016 B2
(45) Date of Patent: Dec. 16, 2003

(54) MOUNTING STRUCTURE OF A SOLID-STATE IMAGE PICK-UP DEVICE

(75) Inventor: Noboru Saitoh, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/227,211

(22) Filed: Aug. 26, 2002

(65) Prior Publication Data

US 2003/0043294 A1 Mar. 6, 2003

(30) Foreign Application Priority Data

Aug. 29, 2001 (JP) ........................................ 2001-259449

(51) Int. Cl.[7] .............................................. H04N 5/225
(52) U.S. Cl. ...................................... 348/374; 257/433
(58) Field of Search ................... 348/374, 373; 257/433

(56) References Cited

U.S. PATENT DOCUMENTS

| | | | | |
|---|---|---|---|---|
| 4,594,613 A | * | 6/1986 | Shinbori et al. ............. | 348/340 |
| 4,734,778 A | * | 3/1988 | Kobayashi ................... | 348/374 |
| 4,803,557 A | * | 2/1989 | Bridges ....................... | 348/374 |
| 5,221,964 A | * | 6/1993 | Chamberlain et al. ....... | 348/373 |
| 5,359,190 A | * | 10/1994 | O'Regan et al. ............. | 250/216 |
| 5,821,532 A | * | 10/1998 | Beaman et al. ............. | 250/239 |
| 5,861,654 A | * | 1/1999 | Johnson ....................... | 257/433 |
| 6,351,288 B1 | * | 2/2002 | Johnson et al. ............. | 348/373 |

FOREIGN PATENT DOCUMENTS

| | | | | |
|---|---|---|---|---|
| EP | WO 99/11056 | * | 4/1999 | .......... H04N/5/225 |
| JP | 05-292380 A | * | 11/1993 | ..................... 5/232 |

* cited by examiner

Primary Examiner—Ngoc-Yen Vu
Assistant Examiner—Heather Long
(74) Attorney, Agent, or Firm—Greenblum & Bernstein, P.L.C.

(57) ABSTRACT

A mounting structure includes a fixing plate to which an image pick-up device is fixed; screw holes formed on a supporting member; a first female threaded portion and a second female threaded portion having a smaller diameter than the first female threaded portion, formed in each screw hole; cylindrical adjustment members which are screwed into the screw holes, respectively, and are rotatable to adjust the axial position thereof; and set screws which are rotatably inserted through the fixing plate and respective axial holes of the cylindrical adjustment members to be engaged with the second female threaded portions of the screw holes to hold the fixing plate between each head portion of the set screws and each cylindrical adjustment member, respectively.

12 Claims, 3 Drawing Sheets

MOUNTING STRUCTURE OF A SOLID-STATE IMAGE PICK-UP DEVICE

BACKGROUND OF THE INVENTION

1. Field of the Invention

The present invention relates to a structure for mounting a solid-state image pick-up device such as a CCD on a supporting member, e.g., a housing of a lens barrel of a digital camera.

2. Description of the Related Art

When a CCD (charge coupled device) serving as a solid-state image pick-up device is mounted on a housing, e.g., a housing of a lens barrel of a digital camera, an inclination of an image captured by the CCD occurs if the CCD is not mounted on the housing at a proper mounting angle.

Accordingly, the CCD needs to be fixed to the housing after the mounting angle of the CCD is set at an optimum angle by visual inspection of a chart image formed on the CCD or by computer processing of an image formed on the CCD.

According to a known mounting structure, firstly a CCD is temporarily fixed by set screws to a fixing plate fixed to a housing, a spacer is then inserted in between the fixing plate and the CCD to set the mounting angle of the CCD at optimum angle, and finally the CCD is permanently fixed to the fixing plate by fastening the set screws. According to another known mounting structure, a set of three compression helical springs are held between a CCD and a fixing plate to which the CCD is fixed while a set of three set screws which are inserted through the fixing plate and the set of three compression helical springs are screwed into a set of three screw holes formed on a housing, respectively, so that the mounting angle of the CCD with respect to the housing can be adjusted by adjusting the amount of engagement of each set screw with each corresponding screw hole.

However, according to the former mounting structure which uses a spacer, when the mounting angle of the CCD is adjusted, the spacer needs to be replaced by another spacer having a different thickness after the set screws are temporarily removed, and thereafter the set screws need to be fastened again. This is troublesome and time-consuming.

On the other hand, according to the latter mounting structure using a set of compression helical springs, a gap exits between the fixing plate and the housing. Due to this structure, the fixing plate tilts if pushed toward the housing, which makes it impossible to maintain an optimum mounting angle for the CCD.

SUMMARY OF THE INVENTION

The present invention provides a mounting structure of a solid-state image pick-up device which makes it easy to adjust the mounting angle of the image pick-up device with respect to a supporting member of the image pickup device to an optimum angle, and which makes it possible to maintain the mounting angle at optimum angle even if an external force is applied to a fixing plate to which the CCD is fixed.

For example, a mounting structure for mounting an image pick-up device on a supporting member in such a manner that a mounting angle of the image pick-up device is adjustable with respect to the supporting member, the mounting structure including a fixing plate to which the image pick-up device is fixed; a plurality of screw holes formed on the supporting member on the fixing plate side; a first female threaded portion and a second female threaded portion, having a diameter smaller than a diameter of the first female threaded portion, which are formed in each the plurality of screw holes in that order from the fixing plate side; a plurality of cylindrical adjustment members which are screwed into the plurality of screw holes, respectively, each the plurality of cylindrical adjustment members having a male threaded portion, which is engaged with corresponding the first female threaded portion and an axial hole, the cylindrical members being rotatable to adjust the axial position thereof; and a plurality of set screws which are rotatably inserted through the fixing plate and the respective axial holes of the plurality of cylindrical adjustment members to be engaged with the second female threaded portions of the plurality of screw holes to hold the fixing plate between each head portion of the plurality of set screws and each the plurality of cylindrical adjustment members, respectively.

It is desirable for each of the plurality of cylindrical adjustment members to include a supporting surface for holding the fixing plate between the supporting members of the plurality of cylindrical adjustment members and the plurality of set screws.

The plurality of screw holes can be formed on the supporting member at different radial positions about a center of the image pick-up device.

It is desirable for each of the plurality of cylindrical adjustment members to include an adjustment gear portion provided outside corresponding one of the plurality of screw holes.

The supporting member can include at least one positioning hole in which a tip of a jig having a gear engageable with the adjustment gear portion can be engaged so that the tip is freely rotatable in the positioning hole.

The mounting structure can further include a plurality of spring members held between the head portions of the plurality of set screws and the fixing member to bias the head portions and the fixing member in opposite directions away from each other, respectively.

The supporting member can serve as a housing of a lens barrel of a digital camera.

It is desirable for there to be at least three screw holes, at least three cylindrical adjustment members, and at least three set screws.

It is desirable for each of the plurality of spring members to be a spring washer.

The supporting member can include a plurality of positioning holes in the vicinity of the plurality of cylindrical adjustment members, respectively, wherein a tip of a jig having a gear which is engageable with the adjustment gear portion can be engaged in any one of the plurality of positioning holes so that the tip is freely rotatable therein.

According to another embodiment, a mounting structure is provided for mounting an image pick-up device on a supporting member in such a manner that a mounting angle of the image pick-up device is adjustable with respect to the supporting member, the mounting structure including a fixing plate to which the image pick-up device is fixed; three screw holes formed on the supporting member to extend in a direction substantially orthogonal to a sensitive surface of the image pick-up device, a large-diameter female threaded portion and a small-diameter female threaded portion being formed in each of the three screw holes in that order from the fixing plate side; three cylindrical adjustment members which are screwed into the three screw holes, respectively, each the three cylindrical adjustment members having a male threaded portion which is engaged with corresponding the large-diameter female threaded portion so that a position of each of the three cylindrical adjustment members can be adjusted with respect to the supporting member by rotating the each of the three cylindrical adjustment members; and three set screws which are inserted through the fixing plate 29 and respective axial holes of the three cylindrical adjustment members to be engaged with the small-diameter female threaded portions of the three screw holes to hold the fixing plate between head portions of the three set screws and the three cylindrical adjustment members, respectively.

The mounting structure can further include a rotational-adjustment device for rotating each the three cylindrical adjustment members to adjust the position of each the three cylindrical adjustment members with respect to the supporting member.

The present disclosure relates to subject matter contained in Japanese Patent Application No.2001-259449 (filed on Aug. 29, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
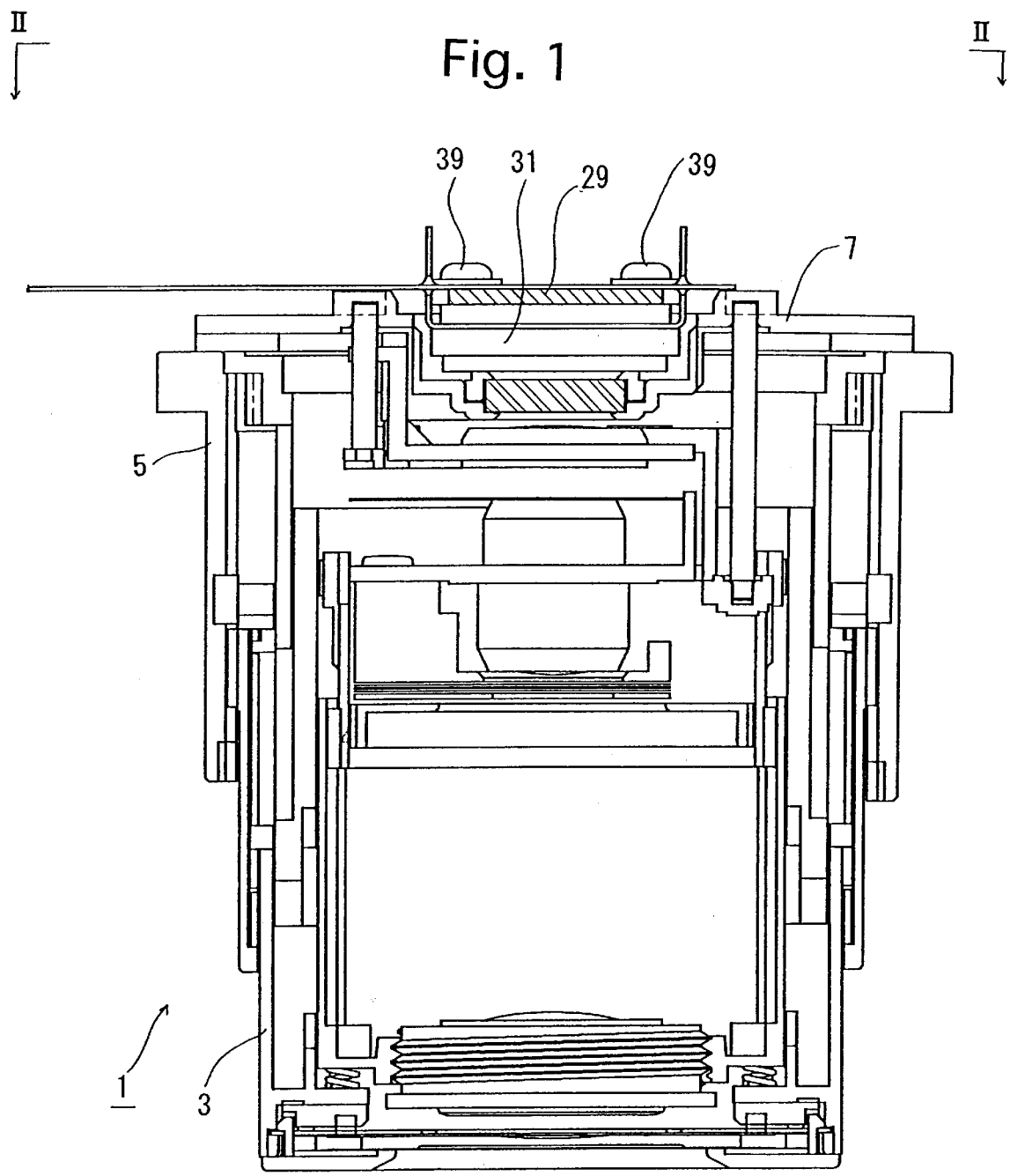
FIG. 1 is an axial transverse sectional view of a digital camera which incorporates an embodiment of a mounting structure of a solid-state image pick-up device according to the present invention.
Figure 2:
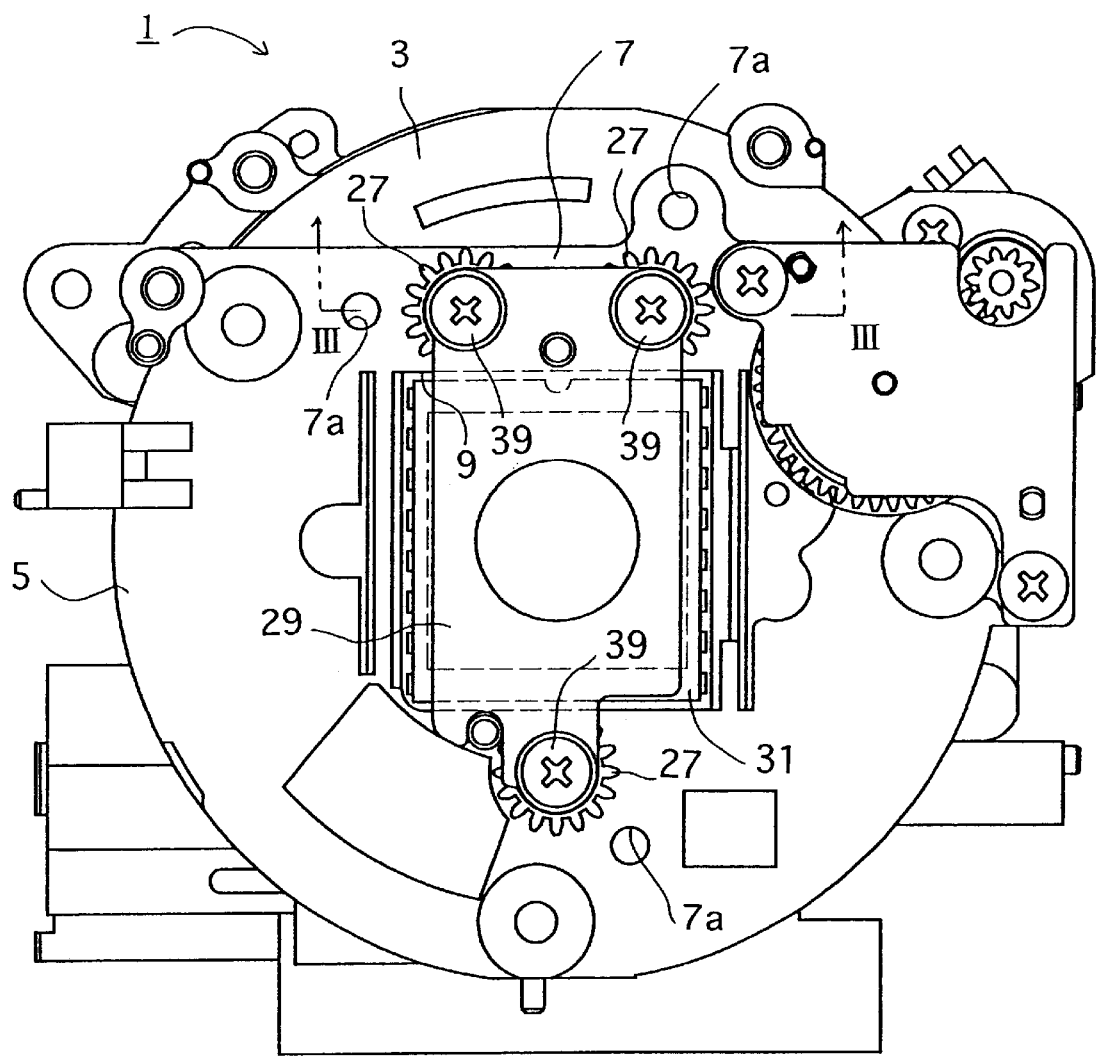
FIG. 2 is a rear elevational view of the digital camera shown in FIG. 1, viewed in the direction of arrows II—II shown in FIG. 1.

As shown in FIG. 1, a digital camera 1 is provided with a lens barrel 3. The lens barrel 3 is provided with a housing (supporting member) 5. The housing 5 is provided on a back wall 7 thereof with an opening 9 (shown by a chain line in FIG. 2) having a rectangular shape as viewed from the front of the lens barrel 3. The backwall 7 is provided, around the rectangular opening 9 at different radial positions about the center of a CCD 31, with three screw holes 11 (see FIG. 3) which extend forwards (downwards as viewed in FIG. 3) parallel to each other. The back wall 7 is provided in the vicinity of the three screw holes 11 with three positioning holes 7a, respectively. The tip of a jig (rotational-adjustment device) A (see FIG. 3) can be inserted into each positioning hole 7a.

Figure 3:
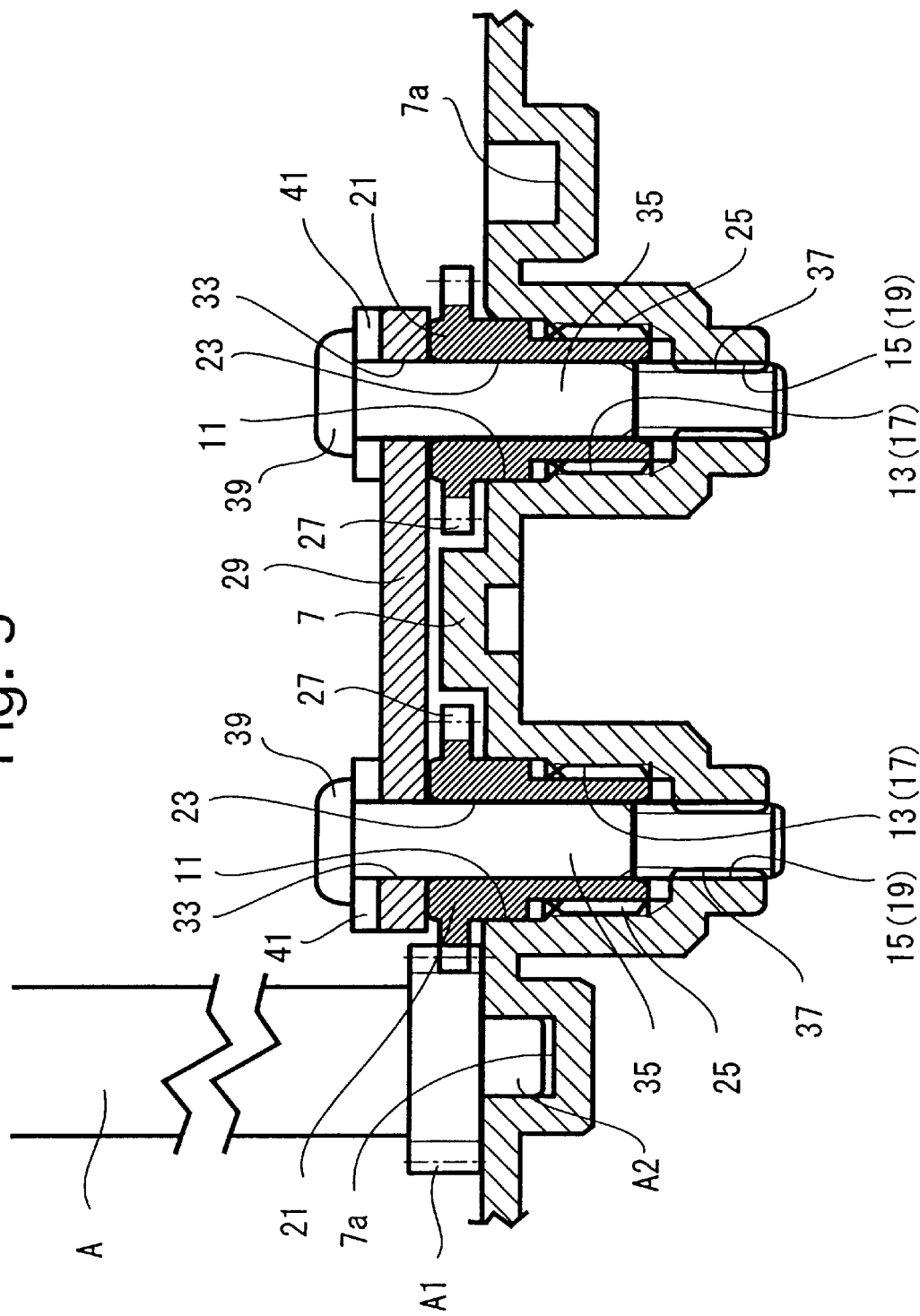
FIG. 3 is a cross sectional view taken along III—III line shown in FIG. 2.

As shown in FIG. 3, each of the three screw holes 11 is provided with a large diameter portion 13 and a small diameter portion 15 formed in front of the large diameter portion 13. The front end (the bottom end as viewed in FIG. 3) of the small diameter portion 15 is formed as an open end. The back wall 7 is provided on an inner peripheral surface of each large diameter portion 13 with a first female threaded portion 17, and is provided on an inner peripheral surface of each small diameter portion 15 with a second female threaded portion 19.

Three adjustment members (cylindrical adjustment members) 21 (only two of which appear in FIG. 3) are removably inserted into the three large diameter portions 15, respectively. Each adjustment member 21 is in the shape of a cylinder, and is provided along an axis thereof with an axial insertion hole 23. Each adjustment member 21 is provided, on an outer peripheral surface thereof at the front end of the adjustment member 21, with a male threaded portion 25 which is engaged with the corresponding first female threaded portion 17. The position of each adjustment member 21 with respect to the corresponding screw hole 11 in the forward/rearward direction (the vertical direction as viewed in FIG. 3) can be adjusted by adjusting the amount of engagement of the male threaded portion 25 with the corresponding first female threaded portion 17. Each adjustment member 21 is provided, on an outer peripheral surface thereof at the rear end of the adjustment member 21, with a gear portion (adjustment gear portion) 27 which can mesh with a gear portion A1 of the jig A.

The CCD 31, which serves as a solid-state image pick-up device, is fixed to the front surface of a fixing plate 29 having a rectangular shape as viewed from the front of the lens barrel 3. The CCD 31 is inserted in the inside of the housing 5 through the rectangular opening 9.

As shown in FIG. 3, the fixing plate 29 is provided, at locations thereon facing the three screw holes 11, with three through holes 33. The fixing plate 29 is fixed to the back wall 7 by three set screws 35 each having a male threaded portion 37 at the front end thereof. Specifically, the three set screws 35 are inserted into the three through holes 33 of the fixing plate 29 and the axial insertion holes 23 of the three adjustment members 21 while the male threaded portions 37 of the three set screws 35 are screwed into the second female threaded portions 19 of the three screw holes 11, respectively, to fix the fixing plate 29 to the back wall 7. A spring washer (spring member) 41 is held between the fixing plate 29 and a head portion 39 of each set screw 35.

The rear end surface of each adjustment member 21 serves as a supporting surface which is normally in contact with the front surface of the fixing plate 29 to hold the fixing plate 29 between the rear end surfaces of the three adjustment member 21 and the head portions 39 of the three set screws 35.

A procedure for adjusting the mounting angle of the CCD 31 with respect to the housing 5 will be hereinafter discussed.

Firstly, an image of an object (not shown) is formed on the CCD 31 and this object image is subjected to image processing by computer (not shown) to determine whether the object image has any image inclination.

If the object image does not have any image inclination, there is no need for the mounting angle of the CCD 31 to be adjusted.

However, if the object image has some image inclination, in order to adjust the image inclination, firstly the three set screws 35 are loosened to a degree without each spring washer 41 being disengaged from either the corresponding set screw 35 and the fixing plate 29. Subsequently, the tip of the jig A is inserted into one of the three positioning holes 7a so that the gear portion A1 that is formed in the vicinity of the jig A meshes with the gear portion 27 of the corresponding adjustment member 21. In this state where the gear portion A1 is in mesh with the gear portion 27 of the corresponding adjustment member 21, the jig A is rotated about the axis thereof.

Forward and reverse rotations of the jig A cause the corresponding adjustment member 21 to move forward and rearward, respectively. During this movement, a portion of the fixing plate 29 which is in contact with the rear surface (supporting surface) of the adjustment member 21 moves together with the corresponding adjustment member 21 in the forward/rearward direction by an amount of movement the same as the amount of movement of the corresponding adjustment member 21, which changes the mounting angle of the fixing plate 29 with respect to the housing 5 to thereby change the mounting angle of the CCD 31 with respect to the housing 5.

Thereafter, a similar adjustment operation using the jig A is carried out for the remaining two adjustment members 21 if necessary. Once it is determined that the object image formed on the CCD 31 has no image inclination, all the three set screws 35 are fastened to securely fix the fixing plate 29 to the housing 5.

The fixing plate 29, the three screw holes 11, the three adjustment members 21 and the three set screws 35 are fundamental elements of the present embodiment of the mounting structure of the solid-state image pick-up device according to the present invention.

As can be understood from the above description, according to the present embodiment of the mounting structure of the solid-state image pick-up device, the mounting angle of the CCD 31 with respect to the housing 5 can be adjusted continuously without removing any of the three set screws 35 during adjustment. This makes it easy to adjust the mounting angle of the CCD 31.

Once the set screws 35 are fastened, the mounting angle of the CCD 31 with respect to the housing 5 does not change even if the fixing plate 29 is pushed toward the housing 5, and the above-described structure allows the mounting angle of the CCD 31 to be maintained at an optimum angle.

Moreover, once the set screws 35 are fastened, no play occurs between the set screws 35 and the fixing plate 29 due to the spring washer 41 held between the fixing plate 29 and the head portion 39 of each set screw 35.

The present invention can be applied to not only the above illustrated embodiment of the mounting structure of the CCD 31 on the housing 5 of the lens barrel 3 of the digital camera 1, but also to any other mounting structure of a solid-state image pick-up device on a supporting member other than the housing 5.

As can be understood from the foregoing, according to the present invention, the mounting angle of the image pick-up device with respect to a supporting member of the image pick-up device can be easily adjusted to an optimum angle, and the mounting angle can be maintained at optimum angle.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A mounting structure for mounting an image pick-up device on a supporting member in such a manner that a mounting angle of said image pick-up device is adjustable with respect to said supporting member, said mounting structure comprising:

a fixing plate to which said image pick-up device is fixed;

a plurality of screw holes formed on said supporting member on the fixing plate side;

a first female threaded portion and a second female threaded portion, having a diameter smaller than a diameter of said first female threaded portion, which are formed in each said plurality of screw holes in that order from the fixing plate side;

a plurality of cylindrical adjustment members which are screwed into said plurality of screw holes, respectively, each said plurality of cylindrical adjustment members having a male threaded portion, which is engaged with corresponding said first female threaded portion and an axial hole, said cylindrical members being rotatable to adjust the axial position thereof; and a plurality of set screws which are rotatably inserted through said fixing plate and said respective axial holes of said plurality of cylindrical adjustment members to be engaged with said second female threaded portions of said plurality of screw holes to hold said fixing plate between each head portion of said plurality of set screws and each said plurality of cylindrical adjustment members, respectively.

2. The mounting structure according to claim 1, wherein each of said plurality of cylindrical adjustment members comprises a supporting surface for holding said fixing plate between said supporting members of said plurality of cylindrical adjustment members and said plurality of set screws.

3. The mounting structure according to claim 1, wherein said plurality of screw holes are formed on said supporting member at different radial positions about a center of said image pick-up device.

4. The mounting structure according to claim 1, wherein each of said plurality of cylindrical adjustment members comprises an adjustment gear portion provided outside corresponding one of said plurality of screw holes.

5. The mounting structure according to claim 4, wherein said supporting member comprises at least one positioning hole in which a tip of a jig having a gear engageable with said adjustment gear portion can be engaged so that said tip is freely rotatable in said positioning hole.

6. The mounting structure according to claim 4, wherein said supporting member comprises a plurality of positioning holes in the vicinity of said plurality of cylindrical adjustment members, respectively, wherein a tip of a jig having a gear which is engageable with said adjustment gear portion can be engaged in any one of said plurality of positioning holes so that said tip is freely rotatable therein.

7. The mounting structure according to claim 1, further comprising a plurality of spring members held between said head portions of said plurality of set screws and said fixing member to bias said head portions and said fixing member in opposite directions away from each other, respectively.

8. The mounting structure according to claim 7, wherein each said plurality of spring members comprises a spring washer.

9. The mounting structure according to claim 1, wherein said supporting member serves as a housing of a lens barrel of a digital camera.

10. The mounting structure according to claim 1, wherein each of the number of said plurality of screw holes, the number of said plurality of cylindrical adjustment members and the number of said plurality of set screws is at least three.

11. A mounting structure for mounting an image pick-up device on a supporting member in such a manner that a mounting angle of said image pick-up device is adjustable with respect to said supporting member, said mounting structure comprising:

a fixing plate to which said image pick-up device is fixed;

three screw holes formed on said supporting member to extend in a direction substantially orthogonal to a sensitive surface of said image pick-up device, a large-diameter female threaded portion and a small-diameter female threaded portion being formed in each of said three screw holes in that order from the fixing plate side;

three cylindrical adjustment members which are screwed into said three screw holes, respectively, each said three cylindrical adjustment members having a male threaded portion which is engaged with corresponding said large-diameter female threaded portion so that a position of each of said three cylindrical adjustment members can be adjusted with respect to said supporting member by rotating said each of said three cylindrical adjustment members; and three set screws which are inserted through said fixing plate and respective axial holes of said three cylindrical adjustment members to be engaged with said small-diameter female threaded portions of said three screw holes to hold said fixing plate between head portions of said three set screws and said three cylindrical adjustment members, respectively.

12. The mounting structure according to claim 11, further comprising a rotational-adjustment device for rotating each said three cylindrical adjustment members to adjust said position of each said three cylindrical adjustment members with respect to said supporting member.

* * * * *